United States Patent

[11] 3,620,829

[72] Inventor Roger W. Beck
Kokomo, Ind.
[21] Appl. No. 726,780
[22] Filed May 6, 1968
[45] Patented Nov. 16, 1971
[73] Assignee General Motors Corporation
Detroit, Mich.

[54] COATINGS FOR GERMANIUM SEMICONDUCTOR DEVICES

3 Claims, 3 Drawing Figs.

[52] U.S. Cl. .................................................... 117/201, 117/106, 117/212, 136/89, 317/235 N
[51] Int. Cl. ...................................................... H01m 15/00, C23c 13/04
[50] Field of Search ......................................... 117/201, 212, 215, 217, 106; 136/89; 317/235, 27, 36

[56] References Cited

UNITED STATES PATENTS

| | | | |
|---|---|---|---|
| 3,455,020 | 7/1969 | Dawson et al. ............... | 317/235 X |
| 3,424,956 | 1/1969 | Sato et al. ...................... | 317/234 |
| 3,391,022 | 7/1968 | Saito ............................ | 117/106 X |
| 3,049,622 | 8/1962 | Ahlstrom et al. ............. | 136/89 |
| 3,104,188 | 9/1963 | Moncrieff-Yeates......... | 136/89 |
| 3,127,226 | 3/1964 | Rector.......................... | 117/106 |
| 3,434,876 | 3/1969 | Stoudenheimer et al. .... | 117/106 X |

*Primary Examiner*—Alfred L. Leavitt
*Assistant Examiner*—Alan Grimaldi
*Attorneys*—R. J. Wallace and William S. Pettigrew

ABSTRACT: A means for stabilizing the recombination velocity at a germanium surface at a minimal value. The active surface of a germanium device is coated with a material that is nonvolatile under device-operating conditions and at least as ionic in character as water. Antimony trioxide provides a particular benefit as a surface recombination velocity stabilization coating in photovoltaic devices.

INVENTOR.
Roger W. Beck
BY
R. J. Wallace
ATTORNEY

COATINGS FOR GERMANIUM SEMICONDUCTOR DEVICES

BACKGROUND OF THE INVENTION

While silicon photovoltaic devices have been extensively used, germanium photovoltaic devices have not. Germanium devices heretofore have been inherently unstable at maximum efficiency. I have found that the maximum efficiency is realized when water is adsorbed on the surface of the device, and that as the amount of adsorbed water varies, so does efficiency of the cell. Hence, if a germanium photovoltaic device is used in an ambient having relatively low humidity conditions, such as a vacuum, the adsorbed humidity is lost and the device commensurately degrades. Analogously, if the device is operated in an ambient in which the relative humidity varies, the efficiency of the device varies with the change in humidity. Moreover, I have found that coating such a device with most antireflection materials to enhance its performance removes this water and isolates the germanium surface from ambient moisture. Hence, use of such a coating inherently substitutes a layer of some other substance for the layer of adsorbed water. Thus, maximum efficiency is inherently unattainable.

I have found that the adsorbed water produces its beneficial effect by reducing surface recombination velocity to a minimal value. Efficiency of a photovoltaic device is highly dependent upon surface recombination velocity at the light-gathering surface. Hence, when a voltaic device is operated under decreasing humidity conditions, the adsorbed water evaporates permitting surface recombination velocity to increase. As the surface recombination velocity increases, efficiency of the device decreases. Moreover, under vacuum conditions virtually all of the adsorbed water can be lost, so that the surface recombination velocity is not suppressed at all.

Also, it appears that the adsorbed water maintains surface recombination velocity at a low value due to its polar or ionic character. In any event, I have found that if I replace the water on the germanium surface with another compound of a similar degree of polar bonding, I can maintain surface recombination velocity at a minimal value even under extremely low humidity conditions. In this manner I can stabilize surface recombination velocity at a low value under varying humidity conditions and even preclude degradation of germanium photovoltaic devices under vacuum conditions.

SUMMARY OF THE INVENTION

It is, therefore, an object of this invention to provide a means for stabilizing recombination velocity at germanium surfaces at an extremely low value irrespective of ambient humidity conditions.

It is a further object of the invention to provide a germanium photovoltaic cell which is stable at its optimum efficiency under all operating conditions.

A still further object of the invention is to provide a method for stabilizing surface recombination velocity on germanium devices, particularly photovoltaic cells at a low value regardless of ambient humidity conditions.

The objects of the invention are accomplished by applying an insulating coating to the active surface of a germanium device, such as the light gathering surface of a photovoltaic cell, of a material which is about as ionic in character as water and which is nonvolatile and inert under the conditions to which the device will be subjected.

BRIEF DESCRIPTION OF THE DRAWING

Other objects, features and advantages of the invention will become more apparent from the following description of the preferred examples thereof and from the drawing, in which.

DESCRIPTION OF THE PREFERRED EMBODIMENTS

Figure 1:
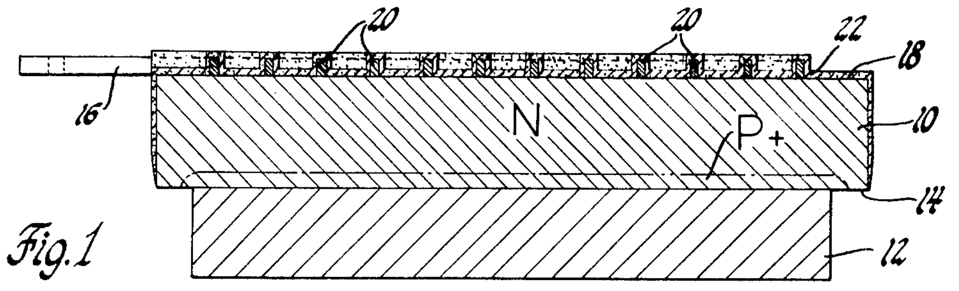
FIG. 1 shows a cross-sectional view of a photovoltaic cell having a stabilizing coating on its light gathering surfaces.

As previously indicated, the invention involves a means for maintaining recombination velocity at germanium surfaces at an extremely minimal value. Surface recombination is a factor affecting the performance of many semiconductor devices. It affects the efficiency of semiconductor devices to varying degrees depending upon the nature of the device and the conditions under which it is operated. Surface recombination is an extremely important factor affecting optimum performance of photovoltaic devices. Consequently, while this invention may be employed in the manufacture of various other germanium devices, it is especially useful in connection with the manufacture of germanium photovoltaic devices. For this reason the ensuing description will be principally directed to this latter category of devices.

The germanium photovoltaic cell shown in the drawing comprises a semiconductor wafer 10 of N-type conductivity having a resistivity of about 0.05 ohm-centimeter. It is about one-half inch square and about 0.05 0.00 6inch in thickness. A thin $P^+$ lower surface region is obtained by shallowly doping the water with a high concentration of an acceptor-type impurity, as by alloying. The $P^+$ region is preferably about 1 mil. thick. The acceptor impurity can be introduced and contact element 12 simultaneously attached by alloying an indium alloy contact member to the lower surface 14 of wafer 10. A 0.03-inch thick contact preform covering substantially the entire lower surface of wafer 10 can be used to form contact element 12. The indium alloy preferably would contain 0.7 percent gallium.

Figures 2, 3:
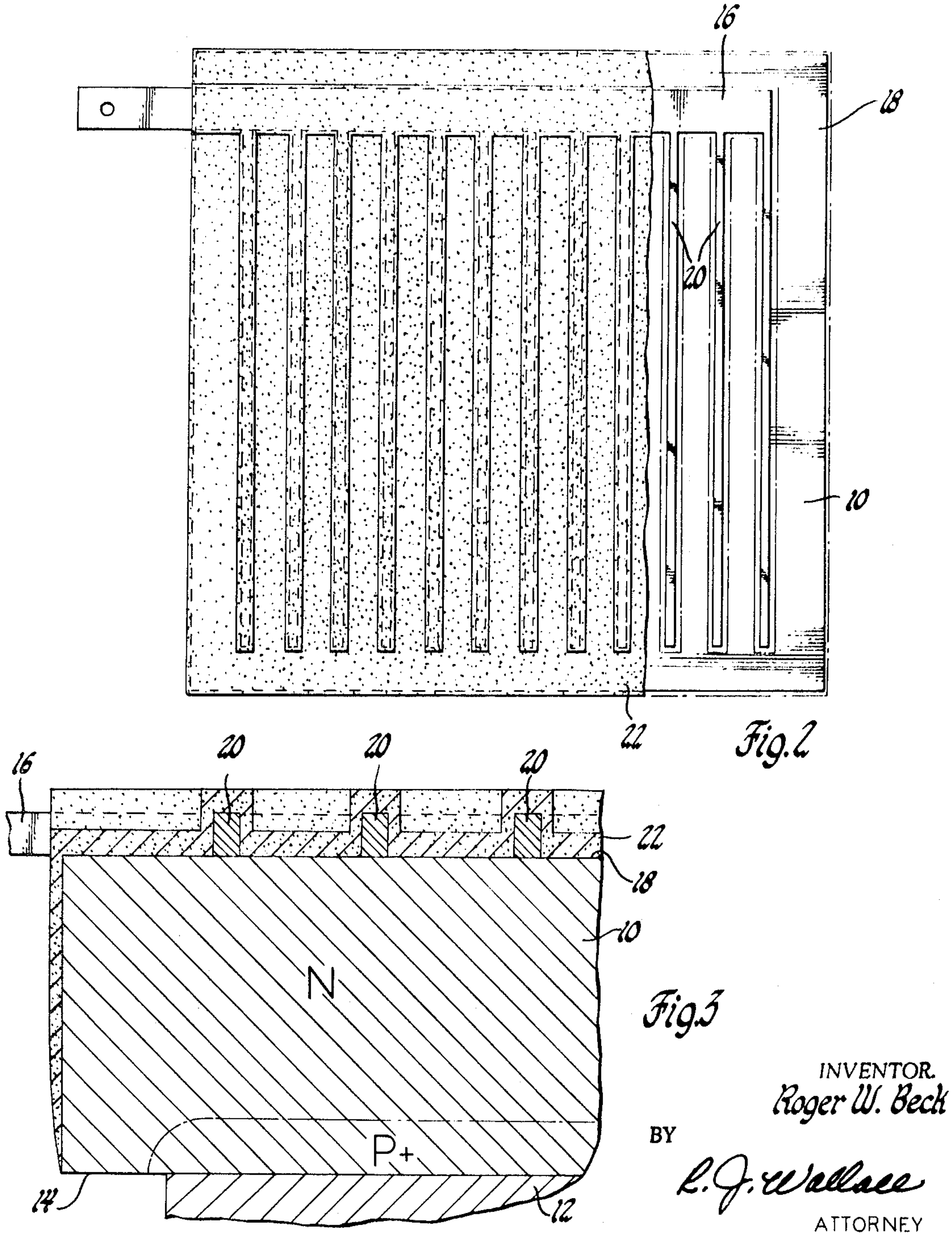
FIG. 2 shows an elevational top view of the device shown in FIG. 1 with a portion of the stabilizing coating broken away.
FIG. 3 shows an enlarged fragmentary view of a portion of the device shown in FIG. 1.

As can be seen in FIG. 2, a comblike grid 16 on the upper surface 18 of wafer 10 serves as a collector contact for the device. The fingers 20 of the collector grid 16 are approximately three-eighths inch long, 0.005 inch in thickness and about 0.002 inch wide. The collector grid can be of any suitable metal, such as molybdenum, applied in any convenient way, e.g. by soldering of a discrete element, evaporation, plating, etc.

A layer 22 of antimony trioxide covers the collector grid and upper surface 18, insulating the entire upper surface and sides of the wafer 10. Best results can thus be assured. In any event, it is desired that the coating should cover those surfaces of the device where surface recombination is most active. Since surface recombination is at best negligible on the lower surface 14 of the wafer, it need not be coated.

The insulating coating should be of a material which is about as ionic in character as water, which has an anion-cation electronegativity difference of approximately 1.4. The anion-cation electronegativity difference in a binary compound must be greater than about 1.0 less than about 1.8 to observe any improvement in suppressing surface recombination. However, the most significant benefits appear available in binary compounds having an electronegativity difference of approximately 1.4, with differences of 1.2–1.6 still providing a major improvement. The electronegativity difference is a measure of the degree of ionic bonding, as pointed out in the Journal of Applied Physics, Volume 27, No. 2, Feb. 1956, pages 101–114.

Lead chloride, cadmium chloride, antimony trioxide and silicon monoxide have electronegativity differences of 1.2, 1.3, 1.6, 1.7, respectively, and have been found to commensurately suppress surface recombination. Cadmium chloride and lead chloride are both water soluble and, hence, are unsuitable for optical coatings. Manganese chloride and gallium nitride each have an electronegativity difference of 1.4. However, the former is strongly deliquescent and the latter expensive and not widely obtainable. Tellurium dioxide also has the optimum electronegativity difference of 1.4 but is highly toxic. Bismuth trioxide has an electronegativity difference of 1.5 but problems have been encountered in forming coatings with it. It is, of course, also necessary that the coating material be nonvolatile and inert under the conditions to which the device will be subjected.

On the other hand, antimony trioxide is substantially insoluble in water, in nonvolatile at normal semiconductor device operating temperatures and in addition displays antireflection characteristics. Hence, in a photovoltaic cell, antimony trioxide singularly provides benefits not available with any other substance which has been found. It not only effectively reduces surface recombination velocity but it also functions as an antireflection coating. As is known, an antireflection coating can significantly enhance the basic properties of a photovoltaic cell. Thus, when antimony trioxide is used in antireflection coating thicknesses, it provides an even greater increase in performance than would be expected.

Insulating coatings of less than about 1,000 angstroms in thickness have been found to be decreasingly effective in reducing surface recombination velocity. On the other hand, thicknesses in excess of about 10,000 angstroms are generally unnecessary and to be avoided. Ancillary practical problems are attendant, such as excess time and cost in coating, cracking and spalling of the coating due to differences in thermal expansion characteristics between the germanium substrate and the coating material, etc. Generally, thicknesses of about 1,000–5,000 angstroms are preferred. As is known, optimum results are obtained with an antireflection coating when it is one-fourth wavelength in optical thickness for the wavelength at which the antireflection effect is desired. For example, a coating of antimony trioxide has a refractive index of about two and for incident radiation of 15,000 angstroms in wavelength, an actual coating thickness of about 1,875 angstroms can be used.

The insulating coating can be applied in any convenient manner that is suitable for both the coating material and the germanium substrate being coated, as for example evaporation, sputtering or the like. It is, of course, preferred that the germanium surface being coated by clean and dry. Antimony trioxide is readily applied by conventional evaporation techniques. For example, a clean and dry germanium surface is placed in a vacuum chamber, the chamber is evacuated in the usual manner and the antimony trioxide heated to evaporate it onto the germanium surface under the vacuum conditions.

While improvements can be realized even though the insulating coating contains imperfections such as pinholes, cracks or the like, it is preferred that the coating be as impervious as possible. To achieve this result I prefer to produce evaporated antimony trioxide coatings at a relatively slow rate, as for example 100 angstroms in thickness per minute. Otherwise, the method of deposition of the insulating coating can be accomplished in the normal and accepted manner.

It is to be understood that although this invention has been described in connection with certain specific examples thereof, no limitation is intended thereby except as defined in the appended claims.

I claim:

1. A germanium photovoltaic cell having an efficiency independent of ambient humidity comprising a germanium body, a rectifying junction in said body responsive to radiation incident on a surface of said body, a collector grid on said surface and a continuous coating of antimony trioxide about 1,000–10,000 angstroms thick on exposed areas of said surface adjacent said grid.

2. The photovoltaic cell as recited in claim 1 wherein the antimony trioxide surface coating material is of appropriate thickness for antireflection purposes.

3. A method for stabilizing the surface recombination velocity of a germanium surface at an extremely low value and rendering said surface virtually insensitive to ambient humidity changes which comprises applying a continuous 1,000–10,000 angstrom-thick coating of antimony trioxide to said germanium surface.

* * * * *

PO-1050
(5/69)

UNITED STATES PATENT OFFICE
CERTIFICATE OF CORRECTION

Patent No. 3,620,829 Dated November 16, 1971

Inventor(s) Roger W. Beck

It is certified that error appears in the above-identified patent and that said Letters Patent are hereby corrected as shown below:

Column 2, line 20, "about 0.05 0.006 inch in thickness." should read -- about 0.006 inch in thickness. --.

Column 2, line 25, "attached by alloying" should read -- attached by shallowly alloying --.

Signed and sealed this 23rd day of May 1972.

(SEAL)
Attest:

EDWARD M.FLETCHER,JR.
Attesting Officer

ROBERT GOTTSCHALK
Commissioner of Patents